(12) United States Patent
Da Rosa et al.

(10) Patent No.: US 8,739,459 B2
(45) Date of Patent: Jun. 3, 2014

(54) BOBBER FOR HIDING OR SHIELDING A HOOK

(75) Inventors: Joaquim Da Rosa, Lexington, SC (US); Casey Davidson, Columbia, SC (US)

(73) Assignee: Pure Fishing, Inc., Columbia, SC (US)

( * ) Notice: Subject to any disclaimer, the term of this patent is extended or adjusted under 35 U.S.C. 154(b) by 98 days.

(21) Appl. No.: 13/458,487

(22) Filed: Apr. 27, 2012

(65) Prior Publication Data

US 2013/0283669 A1 Oct. 31, 2013

(51) Int. Cl.
*A01K 97/04* (2006.01)
(52) U.S. Cl.
USPC ............................................. 43/41.2; 43/44.9
(58) Field of Classification Search
USPC .................................................. 43/41.2, 44.9
See application file for complete search history.

(56) References Cited

U.S. PATENT DOCUMENTS

| | | | | |
|---|---|---|---|---|
| 2,892,283 | A | * | 6/1959 | Hudson .......................... 43/43.4 |
| 4,222,194 | A | * | 9/1980 | Thorvaldsen .................. 43/41.2 |
| 4,534,127 | A | * | 8/1985 | Thorvaldsen .................. 43/41.2 |
| 4,610,104 | A | | 9/1986 | Garcia |
| 4,817,327 | A | | 4/1989 | DeKay |
| 5,960,579 | A | | 10/1999 | Hampton |
| 7,363,743 | B2 | * | 4/2008 | Morken .......................... 43/44.9 |
| 2007/0033857 | A1 | | 2/2007 | Myers |
| 2007/0294934 | A1 | * | 12/2007 | Myers ............................ 43/44.9 |

\* cited by examiner

*Primary Examiner* — Christopher P Ellis (57) ABSTRACT

A bobber, including a buoyant body having a cavity at a first end connected with a passageway through the bobber, and a first shielding structure extending from the body at the first end and at least partially surrounding said cavity. When gravity and/or acceleration forces cause the bobber to slide down the fishing line, the diameter or cross-sectional dimension of the bobber body is sufficiently greater than the diameter or size of the first shielding structure to shield or hide the barbed tip of a fishing hook when a portion of the hook is disposed in the bobber cavity and the tip is disposed outside of the first shielding structure.

19 Claims, 7 Drawing Sheets

BOBBER FOR HIDING OR SHIELDING A HOOK

FIELD OF THE INVENTION

The present invention relates to fishing devices, and more particularly, to a bobber for hiding or shielding a hook.

BACKGROUND OF THE INVENTION

One of the greatest concerns parents have about taking a child fishing is unintentional contact with the hook. Young children want to cast the bait themselves. In their excitement to cast, however, they are often unaware of their surroundings. Coupled with still-developing motor skills, these factors can lead to accidents or a tangled line. Such problems can be made worse when trying to cast a fishing line rigged with a bobber in a fixed relation to a baited hook. Because of this, some parents cast for their children or elect to not take their child fishing, even though either situation prevents the child from learning how to cast.

U.S. Pat. No. 4,610,104 to Garcia discloses a fishing float with a rod in which a hook can be disposed during casting or retrieval. The rod has a flared skirt to guard the hook if it becomes lodged on the rim of the rod. But if the hook becomes lodged on the flared skirt, the hook tip will be exposed. U.S. Pat. No. 4,817,327 discloses a hook keeper fishing float with a cavity to protect a hook tip when storing the hook. But the cavity provides no protection to/from the hook tip during fishing use. U.S. Pat. No. 5,960,579 to Hampton discloses a funnel-shaped device and U.S. Patent Pub. No. 2007/0033857 discloses a bell-shaped device. In each, the hook can be completely contained within the funnel/bell-shaped device. But like the Garcia float, if the hook becomes lodged on the rim of the funnel/bell, the hook tip will be exposed. It would be desirable to have a casting system that would become deployed in use, yet shield the hook from accidental contact with bystanders or entanglement even if the hook tip is not enclosed.

SUMMARY OF EMBODIMENTS OF THE INVENTION

Accordingly, it is an aspect of the present invention to provide a bobber or float that is capable of shielding or hiding a fishing hook during the casting or retrieval process to prevent unintended contact with the hook, yet allow the hook to become unshielded and deployed for fishing.

The foregoing and/or other aspects of the present invention are achieved by providing a bobber, including a buoyant body having a cavity at a first end connected with a passageway through the bobber, and a first shielding structure extending from the body at the first end and at least partially surrounding said cavity. When gravity and/or acceleration forces cause the bobber to slide down the fishing line, the diameter or cross-sectional dimension of the bobber body is sufficiently greater than the diameter or size of the first shielding structure to shield or hide the barbed tip of a fishing hook when a portion of the hook is disposed in the bobber cavity and the tip is disposed outside of the first shielding structure.

The foregoing and/or other aspects of the present invention are also achieved by providing a bobber, including a buoyant body having a through bore, a portion of the through bore at a distal end of the body being enlarged to form a cavity, and a first shielding structure extending distally from the distal end of the body and at least partially surrounding a distal end of the cavity. During casting or retrieval of a fishing hook connected to a distal end of a fishing line passing through the through bore, the bobber is displaced down the fishing line toward the hook to shield or hide the hook. The bobber of an embodiment of the present invention is preferably rigged to slide between a first bobber position where the attached hook is shielded from accidental contact, and a second bobber position where the hook is unshielded and deployed for use. The second bobber position is preferably defined by a stop or stopper, such as a split shot or other weight that is attached to the line ahead of the desired second position. When the bobber is in the first bobber position, the hook is positionable in a first hook position in which at least a portion of the hook, including its tip, is disposed within the cavity, and a second hook position with a portion of the hook disposed within the cavity and its tip disposed outside of the first shielding structure. Additionally, at a position on the bobber body proximal to the first structure, the diameter or size of the body is sufficiently greater than a diameter or size of the first shielding structure that when the hook is in the second position, the bobber body hides or shields the hook tip.

The foregoing and/or other aspects of the present invention are also achieved by providing a bobber, including a buoyant body having a through bore along a displacement axis. A portion of the through bore is enlarged to form a cavity, and a first shield wall extends from the body and at least partially surrounds the cavity. The greatest external dimension of the bobber body substantially perpendicular to the displacement axis is substantially greater than the greatest external dimension of the shield wall in a direction that is also substantially perpendicular to the displacement axis, to prevent unintended contact with a tip of a fishing hook when the hook is at least partially disposed in the cavity and the tip is disposed outside of the first wall.

Additional and/or other aspects and advantages of the present invention will be set forth in the description that follows, or will be apparent from the description, or may be learned by practice of the invention.

BRIEF DESCRIPTION OF THE DRAWINGS

The above and/or other aspects and advantages of embodiments of the invention will become apparent and more readily appreciated from the following detailed description, taken in conjunction with the accompanying drawings, of which.

DETAILED DESCRIPTION OF EMBODIMENTS OF THE PRESENT INVENTION

Reference will now be made in detail to embodiments of the present invention, which are illustrated in the accompanying drawings, wherein like reference numerals refer to like elements throughout. The embodiments described herein exemplify, but do not limit, the present invention by referring to the drawings. As will be understood by one skilled in the art, terms such as distal, proximal, up, down, bottom, and top are relative and are employed to aid a discussion of relative illustration, but are not necessarily limiting.

Figure 1:
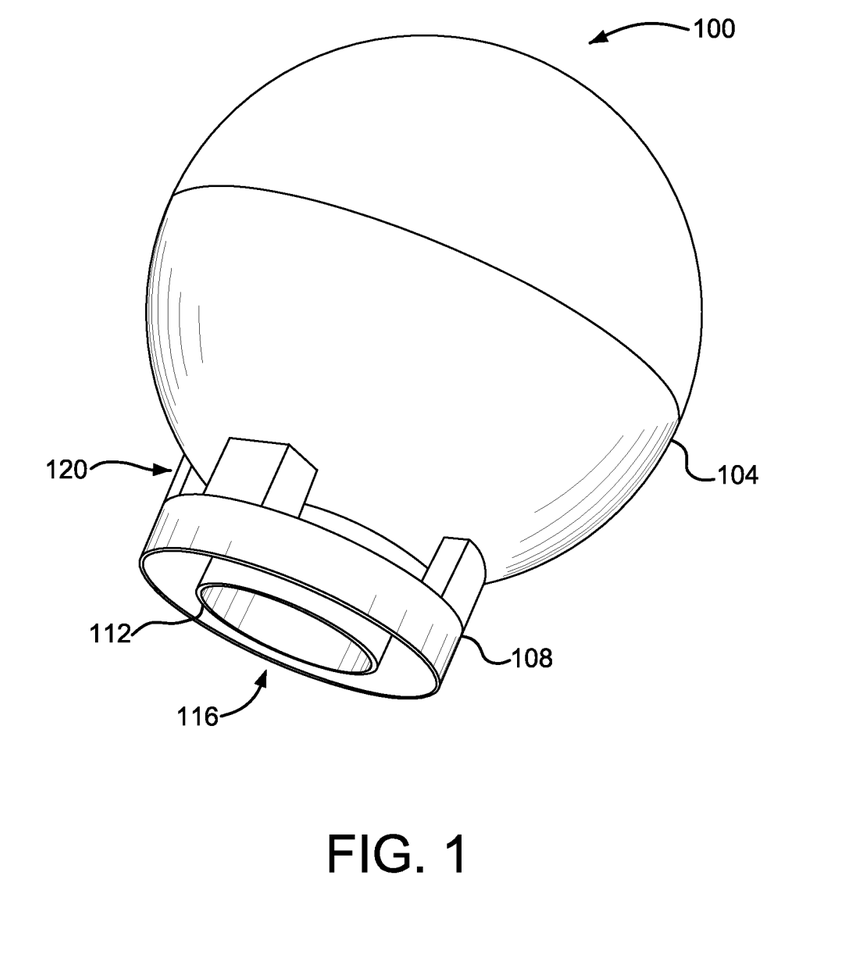
FIG. 1 is a perspective view of a bobber in accordance with an embodiment of the present invention.

As illustrated in FIG. 1, a bobber 100 in accordance with an embodiment of the present invention includes a buoyant body 104 and first or outer structures, lips, rims, or walls 108 and second or inner structures, lips, rims, or walls 112 extending from the distal end of the body 104. The second wall 112 is disposed within the first wall 108, and the first and second walls 108 and 112 surround an opening of a cavity 116. The first wall 108 additionally has lateral openings 120 therethrough for air to escape the space between the first and second walls 108 and 112, so that the bobber 100 floats upright.

Figure 2:
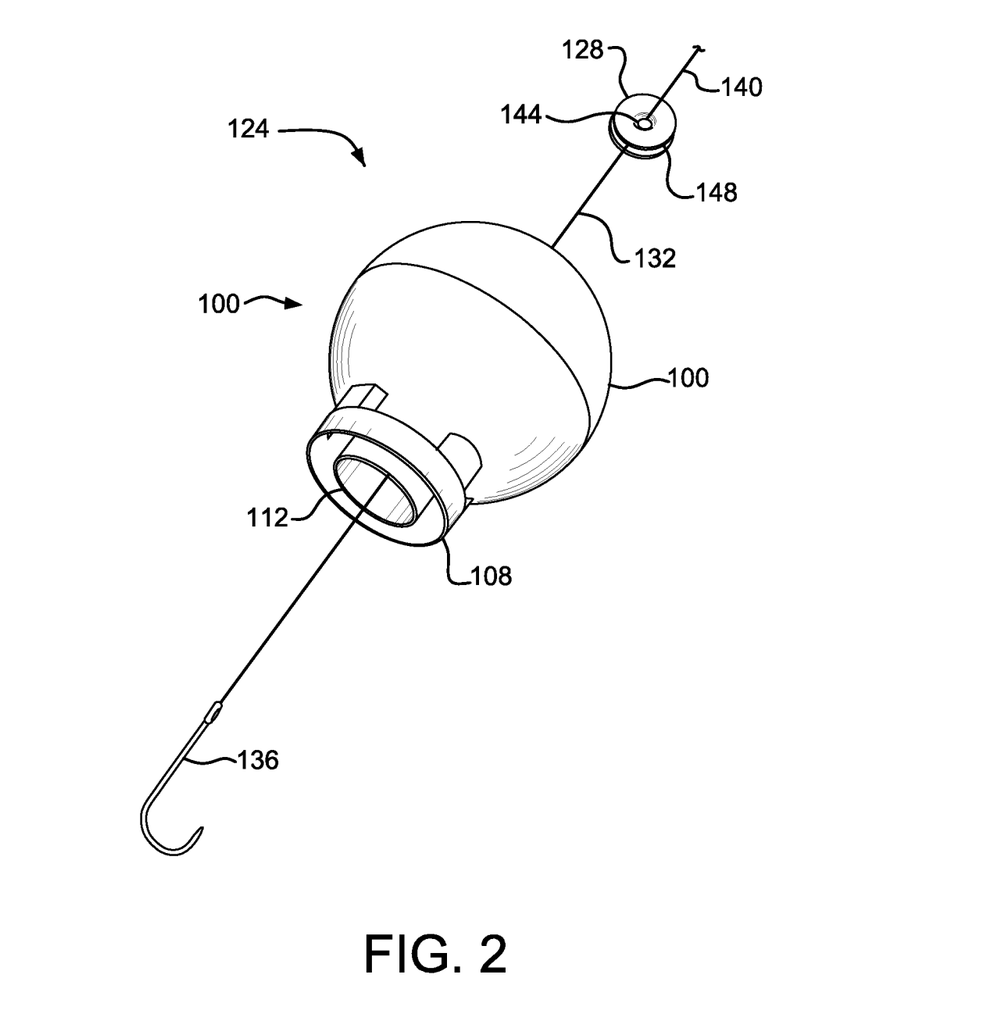
FIG. 2 is a perspective view of a bobber system incorporating the bobber of FIG. 1.

FIG. 2 illustrates a bobber system 124 that includes the bobber 100 and a stopper 128 that is connectable to a line. For example, as shown in FIG. 2, the stopper 128 is connected to a leader line 132 with a fishing hook 136 disposed at its other end. The stopper is also connected with a reel line 140 wound on a fishing reel (not shown). According to one embodiment, the stopper 128 is substantially cylindrical and has an axial hole 144 for connecting with one of the lines. Additionally, stopper 128 has a groove 148 disposed on a perimeter of thereof for connecting with the other line. Although FIG. 2 depicts the reel line 140 tied through the hole 144 and the leader line 132 tied to the groove 148, one skilled in the art will appreciate that the positioning of the lines may be reversed. Further, according to one embodiment, the hole 144 can be omitted and both lines can be connected to the stopper 128 using the groove 148. Alternatively, the groove 148 can be omitted and both lines can be connected to the stopper 128 using the hole 144. One skilled in the art will appreciate that other embodiments of a stopper can be employed without departing from the scope of the present invention. Operation of the bobber system 124 will be described in greater detail below.

Figure 3:
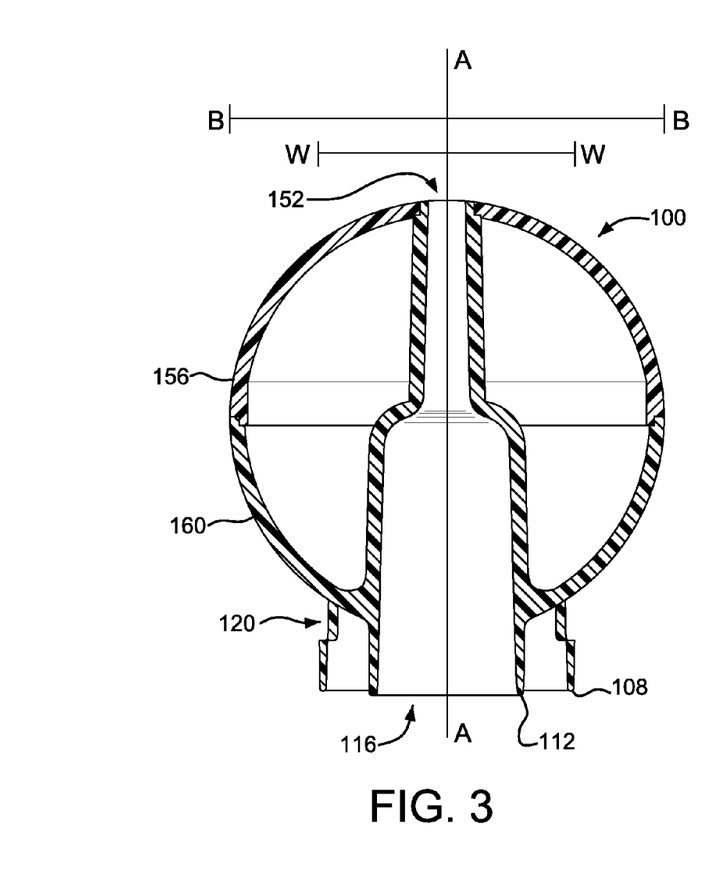
FIG. 3 is a cross-sectional view of the bobber of FIG. 1.

FIG. 3 is a cross-sectional view of the bobber 100. The cavity 116 is connected with a through hole or through bore 152. According to one embodiment, the cavity 116 and the through hole 152 are connected along an axis A-A of the bobber 100. As shown in FIG. 3, the greatest external dimension (or perimeter) of the body 104 perpendicular to the axis A-A (illustrated by line B-B) is substantially greater than the greatest external dimension (or perimeter) of the first wall 108 perpendicular to the axis A-A (illustrated by line W-W). As described in greater detail below, this prevents unintended contact with a tip of a fishing hook, such as hook 136, when the hook is disposed in the cavity 116 and the tip of the hook is disposed outside of the first wall 108.

According to one embodiment, as shown in FIG. 3, the body 104 includes an upper portion 156 and a lower portion 160. The lower portion 160 includes the through bore 152, the cavity 116, and the first and second walls 112 and 108. According to one embodiment, the top portion 156 seals with the lower portion 160 to make the body 104 hollow and buoyant. Seals, such as O-rings can be disposed between the upper and lower portions 156 and 160 to form a substantially watertight connection. Alternatively, as shown in FIG. 3, the upper and lower portions 156 and 160 can mechanically interlock to form a substantially watertight connection. As other alternatives, the upper and lower portions 156 and 160 can be joined by an adhesive can be welded together, for example, by ultrasonic welding. It will be understood by one skilled in the art that other methods of joining the upper and lower portions 156 and 160 can be employed without departing from the scope of the present invention. Further, although depicted as joined parts, the bobber can be integrally formed as a unitary structure The illustrated embodiments depict the upper and lower portions 156 and 160 as being made of plastic. Contemplated plastics include polypropylene, polystyrene, and acrylonitrile butadiene styrene (ABS), although other plastics can be used without departing from the scope of the present invention. Additionally, as one skilled in the art would understand, other materials, such as styrofoam, cork, wood, or metal can be used to make the bobber 100 buoyant. Moreover, although the illustrated embodiments depict the bobber 100 as being hollow, the bobber 100 can be partially hollow (i.e., have a plurality of air chambers), porous, or solid, as long as the bobber 100 is buoyant.

As illustrated in FIG. 3, the second wall 112 forms the lower portion of the cavity 116. Although the second wall 112 is illustrated as having the same diameter as that of the cavity 116, it will be understood by one skilled in the art that the diameters of the cavity 116 and the second wall 112 may differ without departing from the scope of the present invention.

Figure 4:
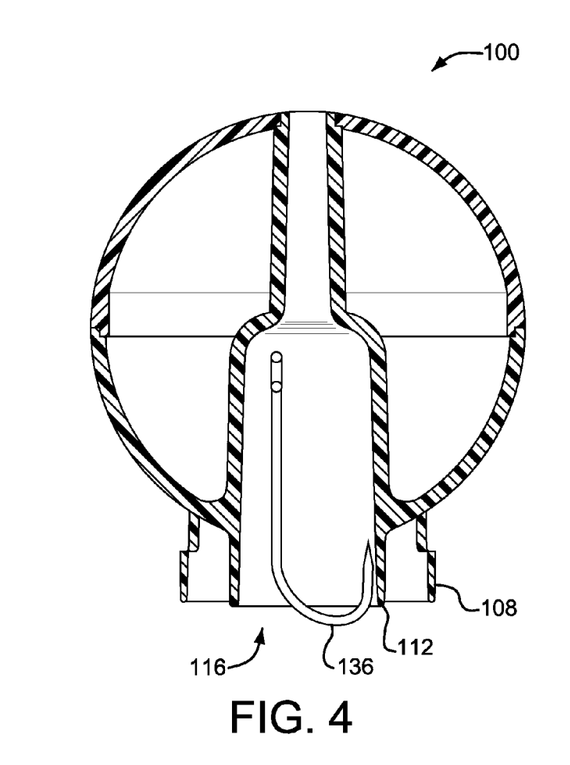
FIG. 4 is a cross-sectional view of the bobber of FIG. 1 with a hook disposed in a first position relative to the bobber.
Figure 5:
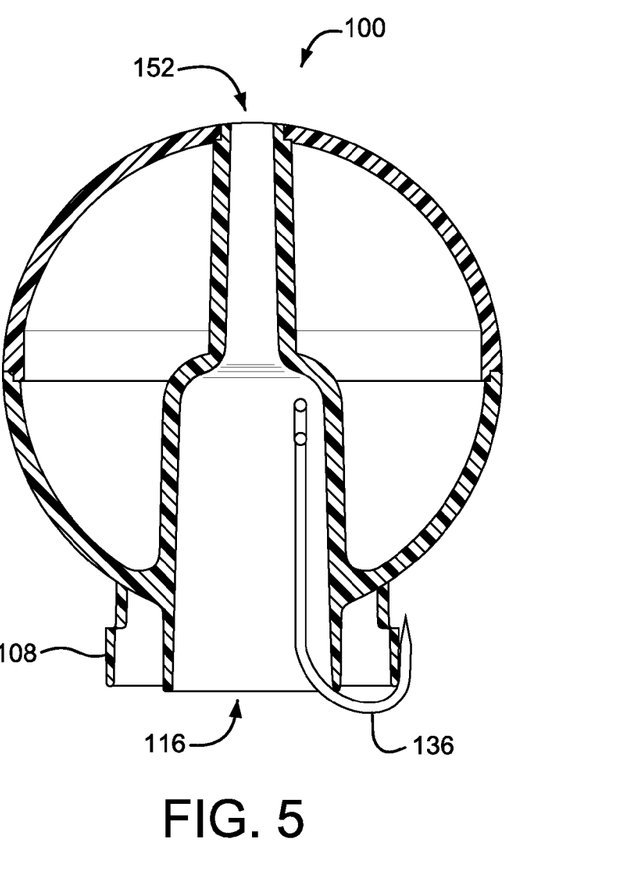
FIG. 5 is a cross-sectional view of the bobber of FIG. 1 with a hook disposed in a second position relative to the bobber.
Figure 6:
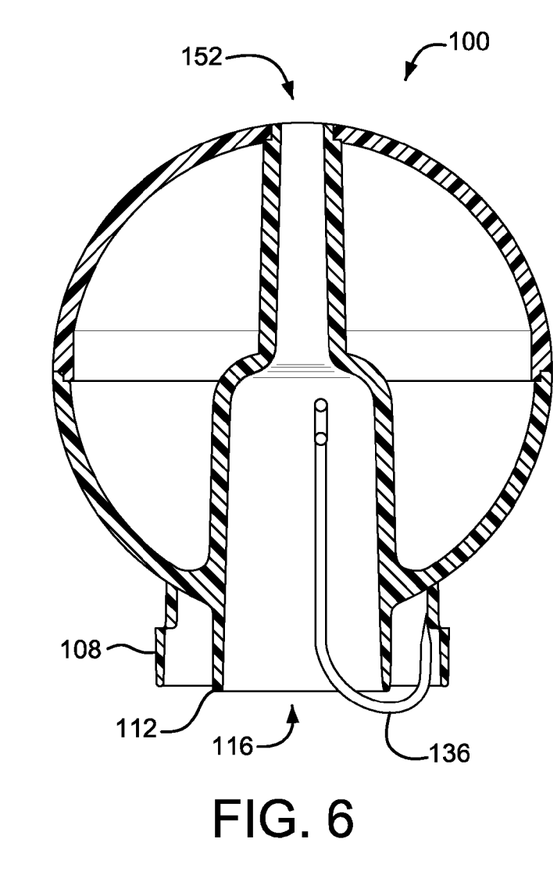
FIG. 6 is a cross-sectional view of the bobber of FIG. 1 with a hook disposed in a third position relative to the bobber.

FIGS. 4-6 illustrate potential positioning of a hook, such as hook 136, relative to the bobber 100. For brevity, the hook 136 will hereinafter be used as a representative fishing hook. According to one embodiment, as shown in FIG. 4, the cavity 116 is sized to permit the hook 136 to be disposed in a first position with both the hook tip and the eye of the hook simultaneously disposed within the cavity 116. In other words, both ends of the hook 136 can fit within the cavity 116. According to another embodiment, the cavity 116 is sized permit the entirety of the hook 136 to be disposed within the cavity 116.

In a second position, shown in FIG. 5, the hook 136 is disposed in the cavity 116 but the tip of the hook is disposed outside the first wall 108. Even so, the perimeter of the body 104 is sufficiently greater than the perimeter of the first wall 108 to prevent unintended contact of the hook tip when the hook 136 disposed in the second position. In this second position, the second wall or inner lip 112 urges the hook tip to rest close to the first wall or outer lip 108 because of the bend of the hook 136 and the contact force between the hook 136 and the second wall 112.

According to one embodiment, the axial length of the first wall 108 and the radial positioning of the first wall 108 relative to the cavity opening prevent the hook tip from contacting the exterior of the body 104 when the hook is disposed in the second position. Such contact could nick or puncture the bobber 100 and dull the point of the hook 136.

In an alternative embodiment, the axial length of the first wall 108 and the radial positioning of the first wall 108 relative to the cavity opening permit the hook tip to contact the exterior of the body 104 when the hook is disposed in the second position. For example, if the body 104 is made of cork or styrofoam, then contact between the hook tip and the body 104 is less likely to dull the hook tip.

FIG. 6 illustrates a third position, in which the hook is disposed in the cavity 116 and its tip is disposed between the first and second walls 108 and 112. Thus, in the first, second, and third positions, unintended contact with the hook tip is prevented.

Referring back to FIG. 2, to rig the bobber system 124, the user ties one end of the leader line 132 to the circumferential groove 148 of the stopper 128. After stringing the other end of the leader line 132 through the bore 152 and the cavity 116, the user ties the other end of the leader line 132 to the eye of the hook 136 with the cavity 116 of the bobber 100 facing the hook 136. The length of the leader line is chosen with regard to the desired submerged depth of the hook 136 relative to the bobber 100. The bore 152 and the stopper 128 are sized to prevent the stopper 128 from passing through the bore 152. After securing the reel line 140 to the stopper 128, e.g., using the hole 144, the bobber system 124 is ready for casting.

Because of inertia and gravity, during a cast, the bobber 100 slides down leader line 132 and encompasses the hook 136 in the cavity 116, so that the hook 136 is in one of the first, second, or third positions (FIGS. 4-6, respectively). As noted previously, these hook positions prevent the sharp point of the hook from coming into contact with any unintended objects.

Once cast, while the bobber 100 floats, the hook 136 sinks down into the water due to gravity until the stopper 128 contacts the bobber 100 at the opening of the through hole 152. Preferably, the hook 136 is heavier than the stopper 128, so that the bobber 100 remains substantially upright when deployed in the water. During retrieval, due to the resistance of the water on the bobber 100, the bobber 100 again slides down the leader line 132 to encompass the hook in one of the first, second, or third positions. Thus, the bobber system 124 minimizes the likelihood of hooking grass, weeds, or other objects in the water, making the bobber system 124 effectively "weedless."

In an alternative embodiment (not shown), the radial spacing between the first and second walls 108 and 112 is greater than the gap between the hook tip and the main portion of the hook. In this embodiment, the hook tip does not reach outside the first wall 108 when the hook is disposed in the cavity. Therefore, when the hook is disposed in the cavity, its tip is either disposed within the cavity or between the first and second walls 108 and 112.

Figure 7:
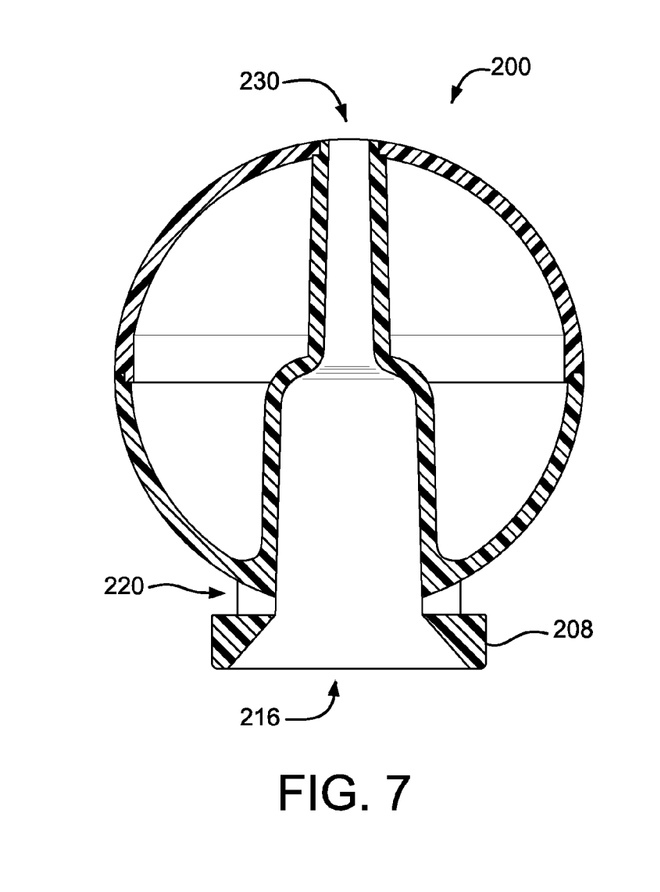
FIGS. 7 and 8 are cross-sectional views of alternative embodiments of bobbers in accordance with the present invention.
Figure 8:
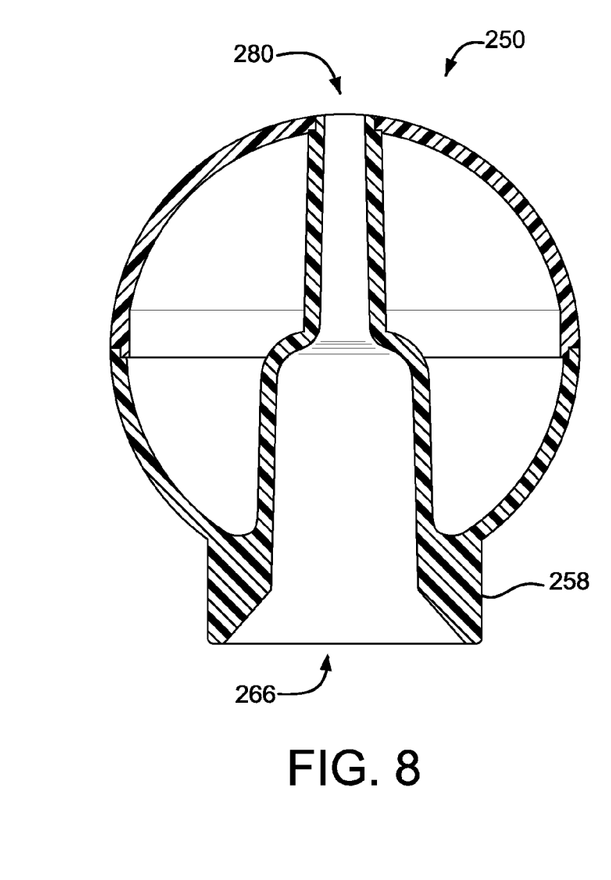

In yet another alternative, in the embodiments shown in FIGS. 7 and 8, the bobber has a single wall extending from the distal end thereof and at least partially surrounding the opening of the cavity. In FIG. 7, the bobber 200 includes a wall 208 disposed about the opening of the cavity 216. In addition to air being able to escape through the cavity 216 and the through hole or bore 230, the wall 208 includes lateral openings 220 therethrough as air escape passages. In contrast, in FIG. 8, the wall 258 of the bobber 250 is disposed about the cavity 266, but is solid; the air can only escape via the cavity 266 or the bore 280.

Figure 9:
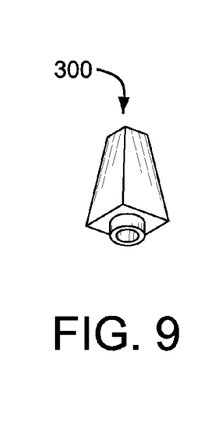
FIGS. 9-13 are perspective views of alternative embodiments of bobbers in accordance with the present invention.
Figure 10:
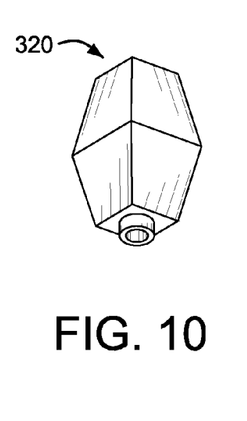
Figure 11:
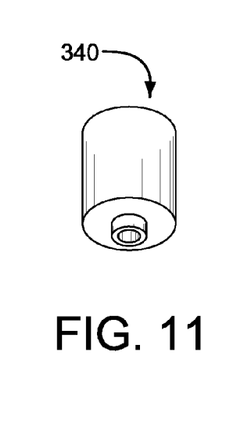
Figure 12:
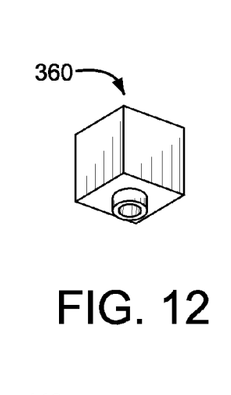
Figure 13:
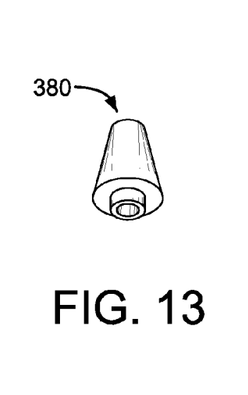
Figure 14:
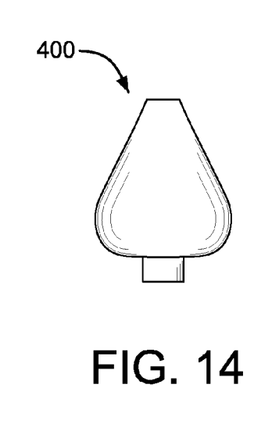
FIGS. 14-16 are front views of alternative embodiments of bobbers in accordance with the present invention.
Figure 15:
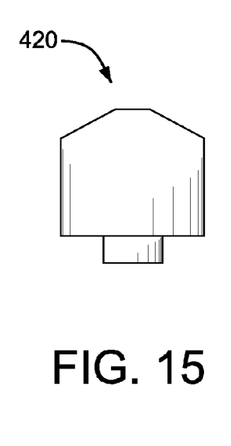
Figure 16:
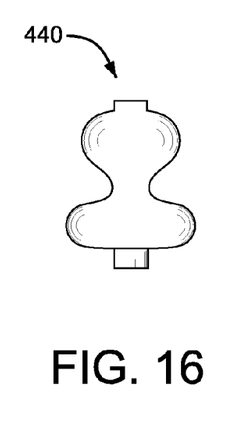

FIGS. 9-13 are perspective views of alternative embodiments of bobbers in accordance with the present invention, and FIGS. 14 and 16 are front views of alternative embodiments of bobbers in accordance with the present invention. Although the previously-described embodiments of bobbers are substantially spherical, other shapes can be used if a perimeter of the body is sufficiently greater than a perimeter of the first or outer wall to prevent unintended contact of a tip of a fishing hook when the hook is disposed in the cavity and the tip is disposed outside of the first structure. For example, the bobber 300 in FIG. 9 is a square-pyramidal frustum or truncated pyramid, and the bobber 320 of FIG. 10 is a square-bi-pyramidal frustum. FIG. 11 illustrates a substantially cylindrical bobber 340, and FIG. 12 illustrates a rectangular solid bobber 360, whereas FIG. 13 illustrates a conical frustum or truncated cone bobber 380. Further, the bobbers 400, 420, and 440 of FIGS. 14-16 are irregularly shaped.

Figure 17:
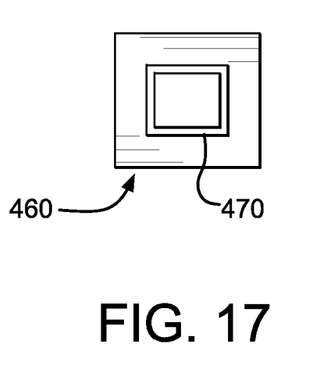
FIGS. 17-20 are bottom views of alternative embodiments of bobbers in accordance with the present invention.
Figure 18:
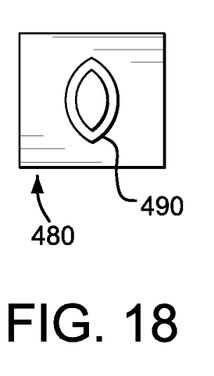
Figure 19:
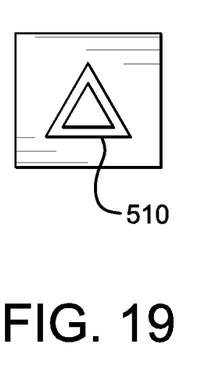
Figure 20:
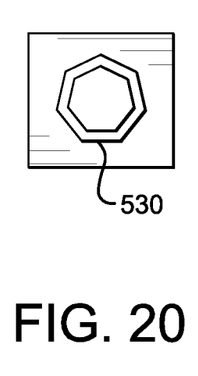

Moreover, the previously-described embodiments of bobbers include substantially cylindrical first or outer walls, but other, faceted shapes can also be used. For example, the wall 470 of the bobber 460 in FIG. 17 is rectangular and the wall 490 of the bobber 480 in FIG. 18 is two-sided. Similarly, the walls 510 and 530 in FIGS. 19 and 20 are triangular and octagonal, respectively. One skilled in the art will appreciate that different shapes can be used without departing from the scope of the present invention. In addition, if an embodiment of the present invention includes a second or inner wall, the inner wall need not necessarily be the same shape as the outer wall. Further, the distally-extending wall(s) can be irregularly shaped.

Thus, embodiments of the present invention provide a bobber capable of shielding or hiding a fishing hook to prevent unintended contact with the hook. The bobber has a through bore connected fluidly connected to a cavity, the opening of which is at least partially surrounded by a distally extending outer wall or lip. Some embodiments also include an inner wall or lip disposed within the outer wall or lip. The perimeter of the bobber is significantly larger than the perimeter of the outer wall or lip. The lip(s) and the cavity receive the hook so that the tip of hook is prevented from inadvertent contact with people, animals, or objects.

In one embodiment, a stopper prevents the bobber from floating higher than the predetermined point relative to the hook. According to one embodiment, the stopper is a cylindrical ring with a groove on the outer diameter to prevent the leader line from slipping off. Furthermore, the stopper has an opening at the center of the cylindrical geometry for a reel line to tie onto.

Although only a few embodiments of the present invention have been shown and described, the present invention is not limited to the described embodiments. Instead, it will be appreciated by those skilled in the art that changes may be made to these embodiments without departing from the principles and spirit of the invention, the scope of which is defined by the appended claims and their equivalents.

What is claimed is:

1. A bobber, comprising:
   a buoyant body having a cavity at a first end connected with a through hole; and
   a first structure extending from the body at the first end and at least partially surrounding an opening of the cavity;
   wherein a perimeter of the body is sufficiently greater than a perimeter of the first structure to prevent unintended contact with a tip of a fishing hook when the hook is disposed in the cavity and the tip is disposed outside of the first structure.

2. The bobber according to claim 1, wherein the body is substantially spherical.

3. The bobber according to claim 1, wherein the cavity is sized to permit the hook tip to be disposed within the cavity.

4. The bobber according to claim 1, wherein an axial length of the first structure and the positioning of the first structure relative to the cavity opening prevent the hook tip from contacting the body when the hook is disposed in the cavity and the hook tip is disposed outside of the first structure.

5. The bobber according to claim 1, further comprising a second structure extending from the body at the first end, disposed within the first structure, and at least partially surrounding the opening of the cavity, wherein the hook tip is positionable between the first and second structures.

6. The bobber according to claim 5, wherein an axial length of the first and second structures and the positioning of the first and second structures relative to the cavity opening prevent the hook tip from contacting the body when the hook is disposed in the cavity and the hook tip is disposed outside of the first structure.

7. A bobber system, comprising:
   a bobber according to claim 1; and a stopper connectable to a line and sized to prevent passage of the stopper through the through hole.

8. The bobber system according to claim 7, wherein the stopper has a substantially cylindrical shape with a hole therethrough for connecting with a first line and a groove disposed on a perimeter of the stopper for connecting with a second line.

9. A bobber, comprising:
a buoyant body having a through bore, a portion of the through bore at a distal end of the body being enlarged to form a cavity; and
a first structure extending distally from the distal end of the body and at least partially surrounding a distal end of the cavity;
wherein during casting or retrieval of a fishing hook connected to a distal end of a line passing through the through bore, the hook is positionable in a first position with the hook and its tip disposed within the cavity and a second position with the hook disposed within the cavity and its tip disposed outside of the first structure; and
wherein at a position on the body proximal to the first structure, the perimeter of the body is sufficiently greater than a perimeter of the first structure to prevent unintended contact with the hook tip when the hook disposed in the second position.

10. The bobber according to claim 9, wherein an axial length of the first structure and the positioning of the first structure relative to the distal end of the cavity prevent the hook tip from contacting the body when the hook is disposed in the second position.

11. The bobber according to claim 9, further comprising a second structure extending distally from the distal end of the body, disposed within the first structure, and at least partially surrounding the distal end of the cavity, wherein the hook is positionable in a third position with the hook disposed in the cavity and its tip disposed between the first and second structures.

12. The bobber according to claim 11, wherein an axial length of the first and second structures and the positioning of the first and second structures relative to the distal end of the cavity prevent the hook tip from contacting the body when the hook is disposed in the second position.

13. A bobber system, comprising:
a bobber according to claim 9; and
a stopper connectable to a line and sized to prevent passage of the stopper through the through bore.

14. The bobber system according to claim 13, wherein the stopper has a substantially cylindrical shape with a hole therethrough for connecting with a first line and a groove disposed on a perimeter of the stopper for connecting with a second line.

15. A bobber, comprising:
a buoyant body having a through bore along an axis, a portion of the through bore being enlarged to form a cavity;
a first wall disposed on an end of the body and at least partially surrounding an exposed end of the cavity; and
a second wall extending from the end of the body, disposed within the first wall, and at least partially surrounding the opening of the cavity, wherein a hook is positionable within the cavity with its tip disposed between the first and second walls
wherein a greatest external dimension of the body substantially perpendicular to the axis is substantially greater than a greatest external dimension of the wall substantially perpendicular to the axis, to prevent unintended contact with the tip of the fishing hook when the hook is disposed in the cavity and the tip is disposed outside of the first wall.

16. The bobber according to claim 15, wherein an axial length of the first wall and the positioning of the first wall relative to the exposed end of the cavity prevent the hook tip from contacting the body when the hook is disposed in the cavity and its tip is disposed outside the first wall.

17. The bobber according to claim 15, wherein an axial length of the first and second walls and the positioning of the first and second walls relative to the exposed end of the cavity prevent the hook tip from contacting the body when the hook is disposed in the cavity and the hook tip is disposed outside of the first wall.

18. A bobber system, comprising:
a bobber according to claim 15; and
a stopper connectable to a line and sized to prevent passage of the stopper through the through bore.

19. The bobber system according to claim 18, wherein the stopper has a substantially cylindrical shape with a hole therethrough for connecting with a first line and a groove disposed on a perimeter of the stopper for connecting with a second line.

* * * * *